June 13, 1944. F. F. KLETT 2,351,053
APPARATUS FOR PURIFYING LIQUIDS
Filed March 31, 1938 2 Sheets-Sheet 2
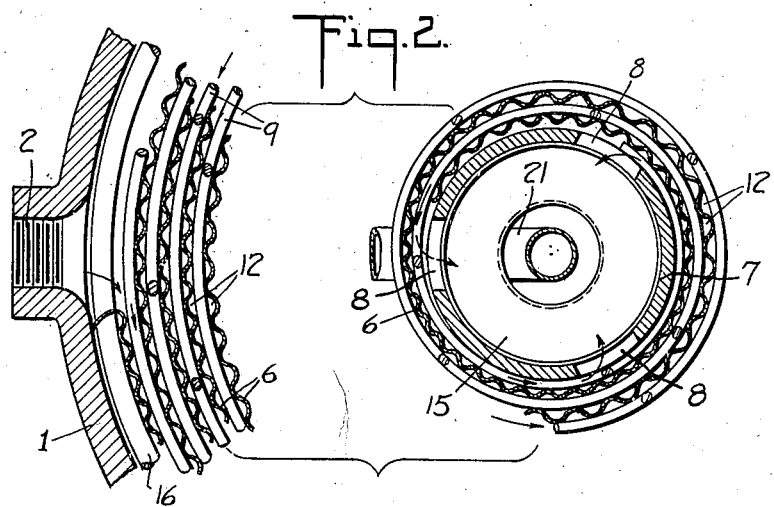
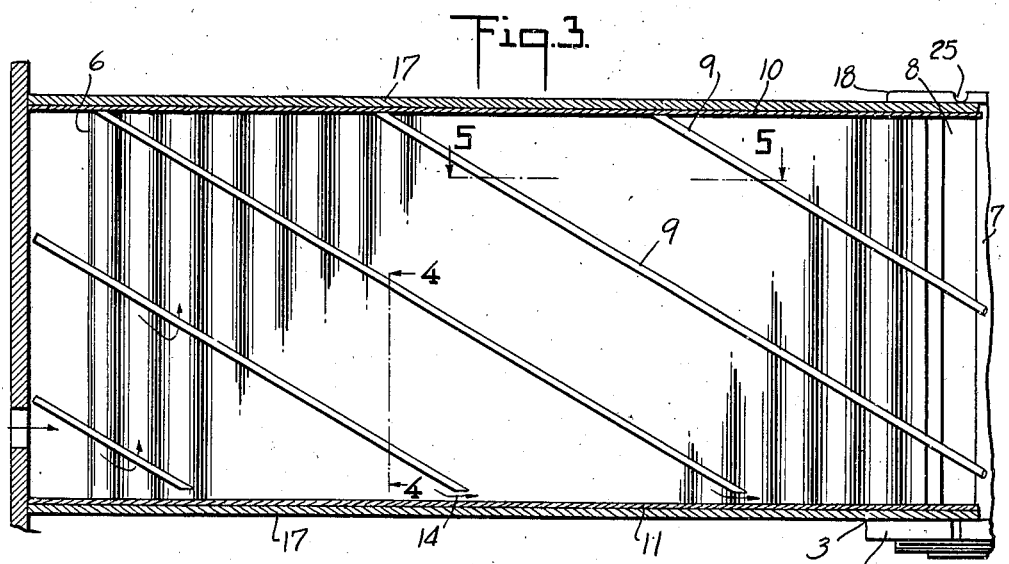
INVENTOR
Fred F. Klett
BY
ATTORNEY Patented June 13, 1944

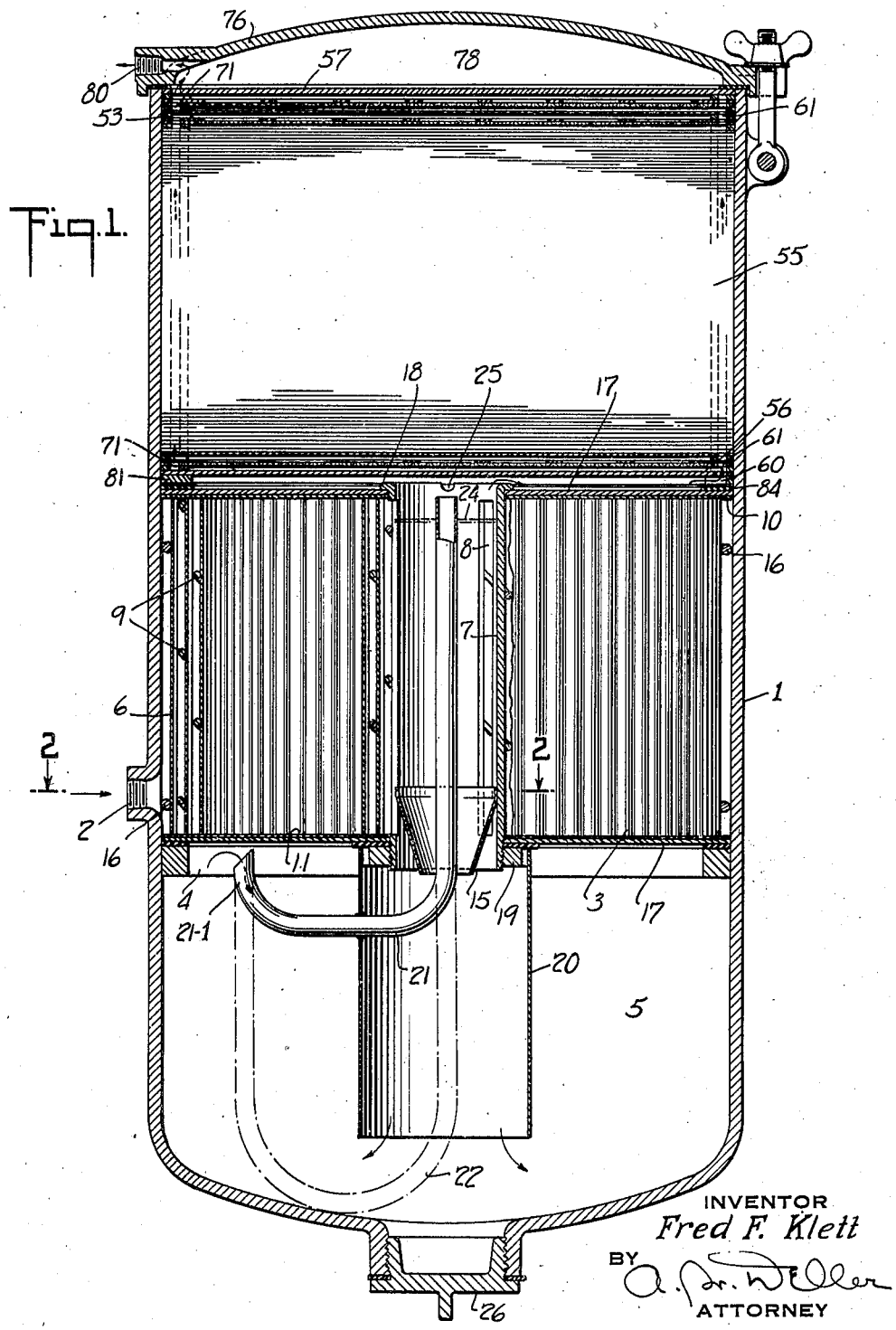

2,351,053

UNITED STATES PATENT OFFICE 2,351,053

APPARATUS FOR PURIFYING LIQUIDS

Fred F. Klett, Brooklyn, N. Y., assignor to Moritz Gaertner, New York, N. Y.

Application March 31, 1938, Serial No. 199,080

11 Claims. (Cl. 210—43)

The present invention relates to a method of treating and purifying liquids, and, more particularly, to an improved method of purifying and regenerating lubricating oil and to an apparatus therefor.

Heretofore, various devices such as clarifiers, separators and filters have been used for removing impurities from liquids. The principal difficulty resided in that the impurities removed from the liquid impaired the effectiveness of the device after a relatively short time of operation. This difficulty was particularly felt when it was desired to remove impurities from lubricating oil, especially from the lubricating oil employed in the circulatory system of the internal combustion engine of an automobile. In a circulatory system of this type, the oil was recirculated again and again and was subjected a great number of times to the high temperatures and pressures within the cylinders of the internal combustion engine, causing important chemical and physical changes to take place in the oil. Dust particles, particles of road dirt and moisture have been sucked into the cylinders with the combustion air and found their way into the lubricating oil. Moreover, small particles of metal produced by the wear of the cylinder walls, pistons, bearings, and other moving parts, carbon and other impurities of strongly abrasive character have been introduced into the oil during the normal operation of the engine. All of these foreign substances and impurities, and others too numerous to be referred to individually, have been strongly emulsified under high pressures and formed a very viscous emulsion which was extremely difficult to break up. Prior purifying methods and devices were incapable of removing these impurities and of maintaining the circulated oil in a pure, clear and effective condition. The principal difficulty resided in the relatively small dimensions available for the purifying device in an automobile. In view of the small space and weight to which the device was necessarily restricted, generally a foraminous element or a filter has been used which had an inadequate filtering area and which became rapidly clogged particularly if all of the impurities were passed therethrough without subjecting the oil to be purified to a preliminary separation into its constituents. Although fine particles, such as dust, abrasives, coke, etc. were relatively easily filtered out, when mixed with moisture, asphaltine and oil, they produced a viscous, sticky, impregnable coating which led to complete blocking of the filter and frequently caused early puncturing of the filter elements under the increased pressure of the circulated oil stream.

Some of these conventional filters had an accentuated height for the purpose of improving the life and the filtering efficiency of the device. This type of construction rather increased than decreased the difficulties referred to in the foregoing. As it was impossible to provide a perfectly homogeneous filtering mass or material within the device, it would offer an unequal resistance to the oil flow at its various points. Under the continued high pressure of the oil circulation, the filtering mass or material would collapse at its weakest points and would form funnels or craters or a large number of tiny passages through which the oil could pass without appreciable resistance or appreciable filtering effect.

It has been already proposed to divide the purifying process into two parts and to first pass the impure oil through a separator or desludger and thereby to relieve the filtering element proper from a substantial portion of its work. Although this principle was theoretically sound, it did not solve the problem as the prior pre-filtering elements attained only a very imperfect and partial separation of the impurities from the oil and even the small percentage so separated was frequently swept back into the circulation due to the counterflow of the stream of purified oil and of the stream of impurities. None of these prior desludger devices succeeded in separating the stream of incoming impure oil into two streams; one consisting of practically pure oil containing but little foreign matter which could be easily removed by a subsequent filtration, and a second stream consisting of the impurities, and in maintaining these two streams separated until the impurities could be permanently withdrawn.

It is an object of the invention to provide an oil regenerator device capable of separating a flow of impure oil into a pair of separate flows, one of which is constituted of increasingly pure oil, the other of which is constituted of the separated impurities.

It is another object of the invention to provide a separator or desludger device in which a substantially horizontal flow of the liquid to be treated is established having a cross section similar to that of a spirally wound ribbon, and a plurality of spaced deflector members are provided in said flow for continuously forcing said flow downwards and to switch the impurities into a separate flow substantially free from obstructions.

Still another object of the invention is to provide an oil purifying device in which the gradually purified stream of oil stays at a higher level due to its lower specific gravity, friction and surface tension and the impurities removed from said stream remain at a low level from which they may be conveniently and permanently withdrawn.

Still another object of the invention is to provide an oil regenerator device adapted to be inserted into the circulatory flow of oil in the lubricating system of an internal combustion engine which device is constituted of a separator or desludger for withdrawing the greater portion of impurities therefrom and to break up emulsions therein and of a subsequent filter for the final removal of the remaining impurities of extremely small size.

It is also within the contemplation of the present invention to provide an improved and novel method of purifying oil which involves establishing a flow of oil having the character of a ribbon of accentuated width extending vertically upwards and flowing between undulating surfaces and being periodically subjected to the effect of a deflecting surface.

The invention also contemplates the provisions of a novel oil purifier device which is constituted of a plurality of stamped, prefabricated elements, which is simple in construction, foolproof in operation and which may be manufactured and sold on a practical and commercial scale at a low price.

Other and further objects and advantages of the present invention will become apparent from the following description taken in conjunction with the accompanying drawings, in which:

Fig. 1 illustrates a vertical sectional view of a preferred embodiment of the invention into an oil regenerator for internal combustion engines;

Fig. 2 depicts a horizontal and fragmentary sectional view at a somewhat enlarged scale, taken on line 2—2 of Fig. 1;

Fig. 3 shows an elevational view of a development of a portion of the corrugated strip illustrated in Fig. 2;

Fig. 4 is a detailed and enlarged vertical sectional view taken on line 4—4 of Fig. 3;

Fig. 5 is a similar view taken on line 5—5 of Fig. 3;

Broadly stated, according to the principles of my invention, I provide a flow of the liquid to be purified and confine this flow in such a manner as to have it stream in the form of a liquid "ribbon." I prefer to provide a substantially horizontal flow which is confined between vertical surfaces and is conducted along a spiral path or along a zig-zag path. I also subject this "ribbon" to spaced constrictions and expansions of its cross section in order to increase the surface friction between the liquid and the confining surfaces. Furthermore, I periodically subject this greatly constricted, and substantially horizontal flow to deflection in a substantially downward direction which although not completely preventing the horizontal flow, will continuously force the incoming liquid downwards. I have discovered that this combination of steps, namely the restriction of the flow into a spiral or zig-zag ribbon-like formation which at spaced points is subjected to constriction and expansion of its cross section and which is periodically subjected to downward deflection, will separate the impure liquids into their constituents such as the pure liquid and the various impurities suspended and emulsified therein. I have found that this principle is especially effective when applied to the purification of lubricating oils such as impure oils which have become polluted in the circulatory lubricating system of an automobile. Experience has shown that subjecting impure and polluted lubricating oil to my improved treatment will quickly separate the ribbon-like flow of impure oil into two flows of which the upper one, at the end of its path will consist of substantially pure oil of lower specific weight and coefficient of friction and the lower one will consist of various impurities, such as sludge, carbon, coke, abrasive particles, road dust etc. suspended in a very small amount of impure oil. Of course, after this separation has been accomplished and the original impure flow has been separated into a flow of pure oil and a flow of sludge, this impure flow can be readily removed and thus the impurities can be withdrawn from the circulation. Although the explanation of this remarkable effect of my novel liquid treating method is not completely established as yet, it appears to be probable that the effect of the strong constriction of the flow to be purified between high vertical walls and of the periodic deflection, is different on the light and pure oil or liquid and on the relatively heavy impurities. Both the great difference in specific weight and in frictional coefficient will tend to separate the original impure flow into two flows at different levels, one of which is a pure and light liquid, and the other a heavy and highly viscous substance. Moreover, the periodic deflection of the liquid in the downward direction in combination with the movement of the liquid ribbon between the confining surfaces has the peculiar added effect of breaking up emulsions, particularly emulsions of water and oil, forming one of the most dangerous impurities in polluted lubricating oils, which could not be practically accomplished with prior oil filters or separators. Of course, this explanation is offered merely to facilitate understanding of my invention by those skilled in the art, but my invention is independent from the more or less correct nature of this theory of operation.

To carry my improved liquid purifying method into practical operation, I generally prefer to employ corrugated sheets or strips made of metal which are arranged in such position with respect to each other as to provide a narrow, erect, and oblong flow channel for the liquid to be purified. In the simplest case, a strip of corrugated metal may be rolled up on a tube, care being taken to leave a small interspace between the adjoining windings or turns of the strip which is going to serve as a flow channel. It will be noted that the flow will have an essentially ribbon-like character and its cross section is subjected to periodical variations in accordance with the corrugations of the partition walls. The deflection of the flow of liquid is preferably accomplished by means of deflectors or deflecting members which may have a variety of forms and constructions. Thus, they may be provided in the form of wires secured to the corrugated strips or plates and having such direction as to enclose an angle less than right angle with the direction of the flow and to cause the deflected or reflected flow into a downward direction. Of course, appropriate spacer members, casings, packing members, etc. have to be incorporated in cooperation with the corrugated partitions and deflectors in order to confine the flow to be treated in the desired manner, as those skilled in the art will readily understand.

I have found that the novel principle discovered by me for the purification of liquids provides the best results when the liquid, such as for example lubricating oil, is subjected to a final filtering operation for the removal of the finest impurities, after the greatest percentage of impurities and of sludge has been removed therefrom by the preliminary desludging treatment described in the foregoing. This has the advantage that the filter proper has merely to treat a liquid already relatively pure and from which most of the impurities have been removed. Therefore, the filtering medium will not be clogged or rendered inoperative but remains in good operating condition for a great length of time. On the other hand, the separator or desludger which is free from foraminous partition walls characteristic of conventional filters, can effectively deal with any practically possible amount of impurities and can remove such impurities from the circulation into a deep sludge chamber from where they may be discharged from time to time.

Referring now more particularly to Figs. 1 to 5 of the drawings, a preferred embodiment of the invention is illustrated. The device shown in Figs. 1 to 5 is designed principally for the purpose of purifying and regenerating the oil in the circulatory system of an internal combustion engine in an automobile. As this problem is one of the most difficult in the art of filters, purifiers and separators, a device, which can successfully treat lubricating oil in an internal combustion engine to permanently retain its purity and lubricating properties, may be employed with at least equal success for purifying and clarifying other liquids of the most various character.

From the oil circulating line of the internal combustion engine (not shown), a preferably flexible connection is provided to a casing 1 having an unrestricted inlet opening 2 in an intermediate portion thereof. As the oil regenerator embodying the invention has ample capacity, no throttling device is necessary and all of the oil stream of the circulatory system may be passed through the device. A separator unit 3 is provided within said casing for desludging the oil to be treated and rests on a ledge or ring 4 permanently attached to the inner surface of casing 1. Ring 4 is mounted in such a position as to provide ample space in the bottom portion of the casing for the purpose of providing a sludge chamber 5 in which the impurities continuously removed from the circulatory flow are retained until such time as they may be conveniently and permanently withdrawn from the system.

As it will be best observed from Fig. 2, the separator or desludger unit 3 essentially comprises a long corrugated strip 6 of metal or of some other appropriate material having strength. Corrugated strip 6 has one of its ends attached to by spot welding (not shown) and is wound around a center tube 7 having slots 8 provided in the circumference thereof, said slots extending upwardly and having a length at least equaling the width of corrugated strip 6. Deflector members in the form of wires 9 constituted of a relatively flexible metal are wound diagonally across sheet or strip 6 and are secured thereto, for example by means of spot welding if strip 6 is of metal. The complete pack or unit constituted of strip 6 and wires 9 is clamped between two circular plates 17, provided at the upper and the lower edges of the strips, respectively. Plates 17 are provided with a suitable resilient packing 10 and 11 or are constituted of soft lead to provide a liquid-tight seal with the edges of the corrugated strip. The upper ends of wires 9 run up to the very top of packing 10, and their lower ends end at a small distance from bottom packing 11 in order to provide a channel 14 for the flow of impurities which will follow a spiral path to openings or slots 8 of the center tube 7. Preferably, wires 9 end at gradually increasing distances from lower plate 11 in order to provide a channel of increasing height corresponding to the gradually increasing quantity of impurities. A small funnel 15 is inserted in tube 7 at the lower end thereof, to separate the clean oil from the sludge and to guide the latter to sludge chamber 5. The spirally wound corrugated sheet 6 is held together by means of wires 16 and is clamped between plates 17 which are held together by means of tube 7 having a shoulder 18 at one end and a nut 19 on the lower threaded end. As a result of the pressure exerted by nut 19, corrugated metal strip 6 is forced against packing 10 and 11 provided on the inner surface of both plates 17, and by-passing between an inner and an outer passage is prevented. A cylindrical member or sleeve 20 is fastened to the outer circumference of nut 19 preferably by press-fit. Sleeve 20 deeply extends into sludge chamber 5 and is completely open at its lower end. A substantially J-shaped tube 21 is permanently attached to sleeve or cylindrical member 20 and has one of its branches 21—1 ending in the sludge chamber in immediate proximity to plate 17 while its other branch extends substantially along the full height of tube 7. A removable plug 26 is provided in the bottom portion of casing 1 and sludge chamber 5 which plug may be removed for the purpose of draining the accumulated sludge from the sludge chamber.

From the preceding description operation of my improved desludger and purifier will be readily understood by those skilled in the art. Impure oil introduced at inlet opening 2, will flow around a spiral path provided between the turns of strip 6 and passing through slots 8 in tube 7 will first fill up sludge chamber 5 and tube 7 with oil from the motor sump. As a result of the inclined character of wires 9 which are obviously constricting the space between the subsequent turns of corrugated strip 6, the liquid flowing within said space is constantly forced down along said wires. The impure liquid which is constantly deflected by means of impeding wires 9 will rise again between corrugation areas 12, as the cross section of the flow channel formed between the wires and the depressed portions of the corrugations of the strip is much greater than the cross section of the flow channel between the wires and the raised portions of the corrugated strip. Therefore, the upward movement of the liquid is considerably slower than the downward movement. Clearly, the impurities contained in the oil flow having a considerably greater surface tension and specific weight than the pure oil, will readily form globules and after having received an initial downward impetus due to their greater specific weight and inertia will stay down, and will flow through passage 14 formed by bottom plate 11 with the lower ends of deflecting wires 9. After having passed through this spiral passage, the sludge will arrive at center tube 7, and will pass through the portions of slots 8 below funnel 15. Funnel 15 inserted in tube 7 will divide the clean oil from the sludge by separating the flow through slots 8 in two portions. The upper portion of this flow, consisting of lighter and relatively pure oil, will enter tube 7 through the portions of slots 8 above funnel 15 and will flow through intake opening 60 in plate 56 into filtering space 55. The lower portion of the flow, consisting of heavier oil mixed with sludge, will flow through the portions of slots 8 below funnel 15 and will be deflected by the outer surface of the funnel into tube 20 and through this into sludge chamber 5. Due to its greater specific weight, the sludge thus separated will sink down and will force upwards the cleaner oil with which the sludge chamber is originally filled at the time when the circulation starts. The cleaner oil displaced from the sludge chamber enters the lower end 21—1 of tube 21. The desludged and purified oil will pass through the upper opening of tube 7 into the upper portion of casing 1 wherein it is subjected to a subsequent filtering, as will be described more fully hereinafter.

As a modification, tube 21 may be extended to the bottom of sludge chamber 5 as denoted by reference character 22 and shown in dash and dotted line. This type of construction has the advantage that the cylindrical member 20 is not perforated by the tube. A spider 24 or some other appropriate member should be provided in this case for holding and centering tube 22. Preferably, notches 25 are cut in shoulder 18 of tube 7. These notches have a depth corresponding to the height of the shoulder and provide channels through which the sludge collected above plate 17 can drop into tube 7 and through the tube into sludge chamber 5. The sludge accumulated in sludge chamber 5 may be discharged from time to time by removing plug 26.

After the liquid has been desludged and clarified, it may be directly conducted to the point of use or it may be subjected to a filtering treatment for extracting the minute impurities which have already been separated from the liquid but have not been removed as yet. The filtering element may have a square or circular form and is preferably built in the same casing as the desludger. Thus, for example, in the oil purifier illustrated in Fig. 1, the upper space 55 located above the desludger may be employed to house the filter assembly. The filtering members or elements are permanently clamped between a pair of heavy plates 56 and 57. Lower plate 56 is provided with an inlet opening 60, and top plate 57 is provided with an outlet opening 71 through which the filtered oil may flow from the filtering element 53 into space 78 underneath cover 76. From space 78, the oil may be withdrawn through an outlet opening 80 into the oil circulating system of the engine. Cover 76 holds the filtering element 53 against a spacer ring 81, and a packing ring 84 seals filtering element 53 from the bottom and separator 3 from the top, and firmly presses the separator against supporting ring 4. In view of the fact that the filter may be of any suitable character and does not form part of the present invention, no detailed description and illustration thereof will be necessary.

It will be noted that the liquid purifier embodying the principles of my invention provides a number of important advantages. Thus, a simple device of small dimensions and weight is provided for the treatment of lubricating oils which is capable of treating a large quantity of lubricating oil at a time and to permanently withdraw sludge, water and other injurious substances therefrom.

It is also to be observed that the invention provides a novel and improved device for the purification and regeneration of polluted liquids in which the small particles of foreign and undesirable substances are continuously forced to the bottom of the device while the gradually purified stream remains at a higher level due to its lower specific gravity, frictional coefficient and surface tension.

Moreover, in the separator embodying the principles of the invention a ribbon-like flow channel is established for the liquid to be purified, between corrugated surfaces and is subjected to the effect of special deflecting members disposed at an angle less than right angle to the direction of the liquid flow. The area of the inclined, diagonal or spiral downflow in the separator is less than the area of corrugations served by this volume so that the speed of the inclined downflow is higher and that of the vertically upward flow is lower. Therefore, the downward flow is subjected to less frictional resistance than the upwardly directed flow in view of the greatly increased surface of the latter. Accordingly, the downward flow will be accentuated and will readily carry the heavier sludge particles towards the lowest level of the stream and finally into the sludge chamber, without encountering any obstructions, counterflow or cross current.

Although the present invention has been described in connection with a preferred embodiment thereof, variations and modifications may be resorted to by those skilled in the art without departing from the principles of the present invention. I consider all of these variations and modifications as within the true spirit and scope of the present invention as disclosed in the present description and defined by the appended claims.

I claim:

1. In a device for purifying liquids, the combination comprising a casing, vertical means in said casing adapted to define a substantially ribbon-like flow channel, an inlet port in said casing connected with one end of such flow channel for introducing liquid to be purified thereinto, upper and lower outlet ports at the other end of such flow channel connected with the upper and lower portions of the channel respectively, said means comprising vertical partitioning disposed in said casing and formed with oppositely disposed corrugations extending into such flow channels to constrict the same at spaced intervals, said corrugations extending across such flow channel, and deflecting members mounted on said partitioning and engaging said oppositely disposed corrugations and having surfaces at an angle other than right angles to the direction of the flow adapted to cooperate with said corrugations to deflect said flow into a downward direction whereby said flow will be separated into an upper flow of relative purity and a lower flow having detrimental impurities suspended therein, said flows capable of being selectively withdrawn through said upper and lower outlet ports.

2. In a device for purifying liquids, the combination comprising a casing, a spirally wound partition wall extending vertically of said casing and adapted to define a substantially ribbon-like flow channel between consecutive windings thereof, an inlet port connected to the outer end of such spiral flow channel for introducing liquid to be purified thereinto, upper and lower outlet ports at the inner end of such spiral flow channel connected to the upper and lower portions of the channel respectively, corrugations in said partition wall to cause constrictions of such channel at uniformly spaced points, and combination spacing and deflecting members extending in a diagonal and downward direction interposed between said windings and corrugations adapted to cooperate with said corrugations to downwardly deflect the flow whereby said flow will be separated into an upper flow of relative purity and a lower flow having detrimental impurities therein, said flows capable of being selectively withdrawn through said upper and lower outlet ports.

3. In a device for purifying liquids, the combination compriisng a casing, a spirally wound partition wall extending vertically of the upper portion of said casing and adapted to define a substantially ribbon-like flow channel between consecutive windings thereof, a sludge chamber in the lower portion of said casing, an inlet port in said casing connected to the outer end of such spiral flow channel for introducing liquid to be purified thereinto, a tubular outlet member in the center of said casing having openings in communication with the inner end of such flow channel and having its lower end connected with said sludge chamber, corrugations in said partition wall to cause constrictions of such channel at uniformly spaced points, combination spacing and deflecting members diagonally extending and interposed between said windings and corrugations adapted to cooperate with said corrugations to downwardly deflect said flow whereby the flow will be separated into an upper flow of relative purity and a lower flow having detrimental impurities suspended therein, a separator member in said outlet member positioned to separate said upper and lower flows from each other and guide said lower flow into said sludge chamber, and an outlet port for said upper flow communicating with the upper end of said outlet member to withdraw the relatively purified upper flow from the device.

4. In a device for purifying liquids, the combination comprising a casing, a spirally wound corrugated partition wall extending vertically of the upper portion of said casing and adapted to define between consecutive windings thereof a substantially ribbon-like flow channel having constrictions at uniformly spaced points, an inlet port for liquid to be purified in such casing connected to the outer end of said spiral flow channel, a tubular outlet member in the center of said casing having slits therein through which it communicates with the inner end of such flow channel, combination spacer and deflector members interposed between said windings and corrugations and extending diagonally to the direction of the flow adapted to cooperate with said corrugations to downwardly deflect said flow and to cause separation thereof into an upper flow of relative purity and a lower flow having detrimental impurities suspended therein, a funnel-shaped separator member arranged in said tubular outlet member to maintain separation of said upper and lower flows, a sludge chamber in the lower portion of said casing connected to the lower end of said outlet member, and an outlet port for the relatively purified liquid connected to the upper end of said outlet member.

5. In a device for purifying liquids, a casing, vertical partitioning within said casing defining a substantially ribbon-like flow channel, an inlet port in said casing connected with one end of such flow channel for introducing liquid to be purified, upper and lower outlet ports at the other end of said flow channel, members positioned within such flow channel with surface portions inclined to the direction of liquid flow for downwardly deflecting liquid impinging thereon, said partitioning being formed with protuberances extending into such flow channel and constricting the same at spaced intervals to cause a ribbon-like flow of fluid therethrough and defining flow paths extending vertically from said members and arranged to permit liquid to move upwardly about said members whereby the liquid flow is separated into an upper flow of relative purity and a lower flow that is relatively more concentrated with detrimental impurities as compared with the introduced liquid, said upper and lower flows respectively communicating with said upper and lower outlet ports for selective withdrawal from the device.

6. In a device for purifying liquids, a casing, vertical partitioning within said casing defining a substantially ribbon-like flow channel, an inlet port in said casing connected with one end of such flow channel for introducing liquid to be purified, upper and lower outlet ports at the other end of such flow channel, deflecting members mounted on said partitioning with surface portions inclined to the direction of liquid flow for downwardly deflecting liquid impinging thereon, said partitioning being formed with protuberances extending into and constricting said flow channel at spaced intervals to cause a ribbon-like flow of fluid therethrough and defining flow paths extending upwardly from said members and arranged to permit liquid to pass around said members whereby the liquid flow is separated into an upper flow of relative purity and a lower flow that is relatively more concentrated with detrimental impurities as compared with the introduced liquid, said upper and lower flows respectively communicating with said upper and lower outlet ports for selective withdrawal from the device.

7. In a device for purifying liquids, a casing, partitioning within said casing defining a substantially ribbon-like flow channel, an inlet port in said casing connected with one end of such flow channel for introducing liquid to be purified, upper and lower outlet ports at the other end of such flow channel respectively connected with upper and lower portions of the channel, members at said partitioning with surface portions inclined to the direction of liquid flow for downwardly deflecting liquid impinging thereon, said partitioning having vertical corrugations extending into said flow channel and constricting same at spaced intervals to cause a ribbon-like flow of fluid therethrough, said corrugations being arranged to permit liquid to move upwardly about said members whereby the liquid flow is separated into an upper flow of relative purity and a lower flow that is relatively more concentrated with detrimental impurities as compared with the introduced liquid, said upper and lower flows respectively communicating with said upper and lower outlet ports for selective withdrawal from the device.

8. In a device for purifying liquids, a casing, an impervious corrugated structure arranged to define a substantially ribbon-like flow channel, an inlet port in said casing arranged to communicate with one end of such flow channel for introducing liquid to be purified, a plurality of spaced wires connected to opposing corrugations of said structure and extending diagonally across the flow channel thereof for deflecting liquid impinging thereon in a downward direction and downwardly impel suspended detrimental impurities to provide a lower flow of liquid with a relative concentration of detrimental impurities, the corrugations in said structure extending vertically to permit liquid to move upwardly beyond said wires and provide an upper flow of relative purity, and upper and lower outlet ports respectively communicating with said upper and lower flows for selective withdrawal thereof from the device.

9. In a device for purifying liquids, a casing, an impervious corrugated strip extending vertically of said casing and spirally wound to define a substantially ribbon-like flow channel between opposed surfaces of the strip, an inlet port in said casing connected with one end of such flow channel for introducing liquid to be purified, packing sealing the upper and lower edges of the wound strip to confine such flow channel therebetween, a plurality of spaced deflector wires separating said opposed surfaces and arranged diagonally across such flow channel to deflect liquid in a downward direction and downwardly impel suspended detrimental impurities thereof, the upper ends of said wires extending to the packing at the upper edge of said strip, the lower ends of said wires terminating above the lower edge of said strip to provide a lower flow of liquid having a relative concentration of detrimental impurities, the corrugations of said strip permitting liquid to move upwardly beyond said wires and provide an upper flow of relative purity, and upper and lower outlet ports respectively communicating with said upper and lower flows for selective withdrawal thereof from the device.

10. In a device for purifying liquids, a casing, an impervious corrugated strip extending vertically of said casing and spirally wound to define a substantially ribbon-like flow channel between opposed surfaces of the strip, an inlet port in said casing connected with one end of such flow channel for introducing liquid to be purified, a plurality of spaced wires separating said opposed surfaces and arranged diagonally across such flow channel to deflect the liquid flow in a downward direction and downwardly impel suspended detrimental impurities thereof to provide a lower flow of liquid having a relative concentration of detrimental impurities, the corrugations of said strip permitting liquid to move upwardly beyond said wires and provide an upper flow of relative purity, a tubular outlet member having openings communicating with the other end of such flow channel, a sludge chamber extending from said casing and communicating with the lower end of said member, a separator element associated with said member for separating the upper and lower flows within the member and directing the lower flow into said sludge chamber, and an outlet port in said casing communicating with the upper end of said member.

11. In a device for purifying liquids, a casing, an impervious corrugated strip extending vertically of said casing and spirally wound to define a substantially ribbon-like flow channel between opposed surfaces of the strip, an inlet port in said casing connected with the outer end of the spiral flow channel for introducing liquid to be purified, packing sealing the upper and lower edges of the wound strip to confine said flow channel therebetween, a plurality of spaced wires separating said opposed surfaces and arranged in the flow channel diagonally across said strip to deflect the liquid flow in a downward direction and downwardly impel suspended detrimental impurities thereof, the upper ends of said wires extending to the upper edge of said strip and packing, the lower ends of said wires terminating above the lower edge of said strip to provide a lower flow of liquid having a relative concentration of detrimental impurities, the corrugations of said strip permitting the liquid to move upwardly beyond said wires and provide an upper flow of relative purity, a central tubular outlet member having openings communicating with the inner end of the spiral flow channel, a sludge chamber extending from said casing and communicating with the lower end of said member, a separator element positioned within said member for separating the upper and lower flows within the member and directing the lower flow into said sludge chamber, an open ended tube extending from the upper region of said sludge chamber to the upper region of said member, and an outlet port in said casing communicating with the upper end of said member.

FRED F. KLETT.